Aug. 20, 1968  L. LEONARDI  3,397,625
APPARATUS FOR PRODUCING HELICALLY WOUND CYLINDERS
Filed Oct. 11, 1965
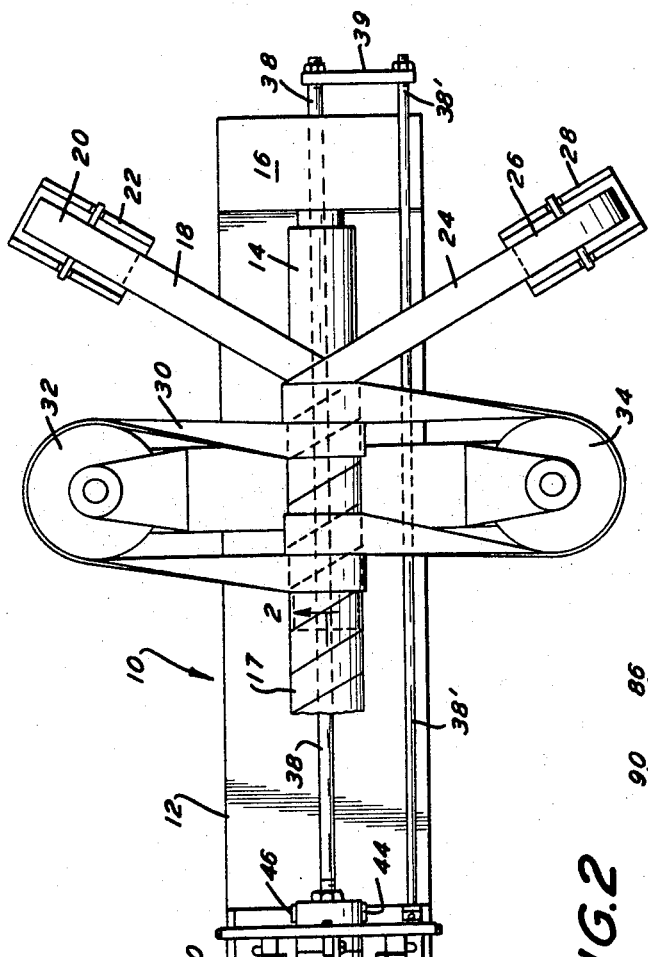
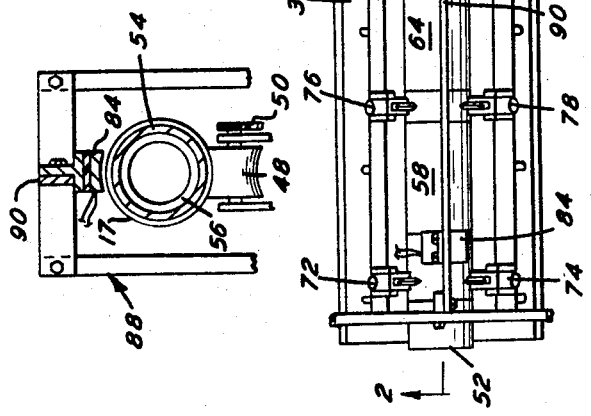
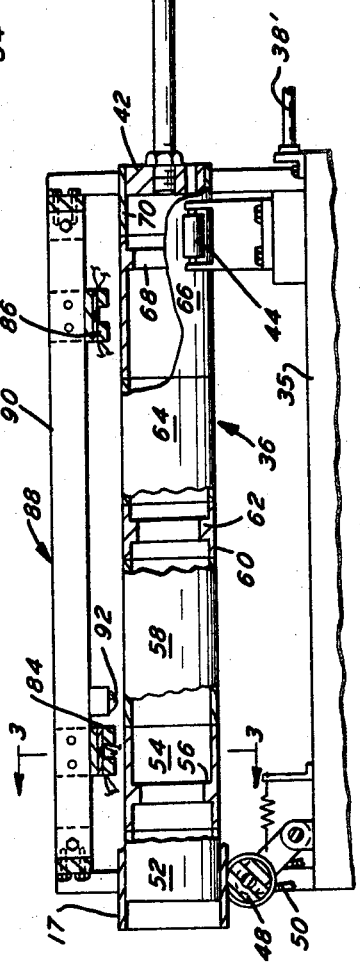
INVENTOR
LEONARD LEONARDI
BY Seidel & Gonda
ATTORNEYS.

United States Patent Office 3,397,625
Patented Aug. 20, 1968

3,397,625
APPARATUS FOR PRODUCING HELICALLY
WOUND CYLINDERS
Leonard Leonardi, Moorestown, N.J., assignor to Dietz
Machine Works, Inc., Philadelphia, Pa., a corporation
of Pennsylvania
Filed Oct. 11, 1965, Ser. No. 494,559
3 Claims. (Cl. 93—80)

ABSTRACT OF THE DISCLOSURE

Apparatus for producing helically wound cylinders including an anvil reciprocally and rotatably supported by a carriage in line with a mandrel. A stripping roller is provided adjacent the free end of the anvil. The weight of the anvil is counterbalanced by magnetic means which attracts the free end portion of the anvil upwardly away from the stripping roller to thereby prevent bunching of the helically wound cylinders between the outer periphery of the anvil and the stripping roller.

---

This invention relates to an apparatus for making helically wound cylinders. The apparatus of the present invention is generally referred to as a helical tube winding machine. In such a machine, container bodies or tubes of predetermined length are produced by helically winding webs of paper or other material on a stationary mandrel while causing the webs to be continuously moved in an axial direction along the mandrel. Such machines are known to those skilled in the art. For example, see U.S. Patent 2,699,099.

In the machine of the present invention, an anvil is reciprocally and rotatably supported by a carriage in line with the mandrel and has a diameter corresponding to that of the mandrel. In accordance with conventional structure, the carriage is reciprocally supported so that it may move back and forth with respect to the tube being produced. Also, in accordance with conventional structure, the carriage is provided with cutters which will cut the tubes into predetermined lengths. As pointed out in the above patent, for example, reciprocation of the carriage and the use of flying cutters will enable the tubes to be cut at predetermined locations.

In the machine of the present invention, a stripping roller is provided adjacent the free end portion of the anvil. The tube being produced will be fed between the anvil. The tube being produced will be fed between the juxtaposed surfaces of the anvil and the stripping roller. The stripping roller is a driven roller supported by the carriage. The weight of the anvil on the stripping roller causes the material of thin walled tubes of a diameter greater than approximately 5–8 inches to bunch up at the stripping roller, buckle between the mandrel and anvil, and/or otherwise interfere with the continuous production of spirally wound tubes cut to unit lengths.

The anvil, during operation of the machine, is continuously rotated and intermittently reciprocated while being continuously surrounded by the tube being produced. With an anvil utilized in this environment and the problem associated with bunching of the material between the outer periphery of the anvil and the stripping roller, the present invention solves this problem by counterbalancing the anvil. The counterbalancing is accomplished by magnetic means which attracts the free end portion of the anvil upwardly away from the stripping roller.

Thus, the apparatus of the present invention includes a horizontally disposed mandrel around which a cylinder may be helically formed. An anvil is in line with the mandrel and has a free end from which the cylinder may be discharged. Means are supported above a portion of the anvil adjacent the free end thereof for magnetically attracting said portion upwardly.

It is an object of the present invention to provide apparatus for producing helically wound cylinders in a diameter in excess of 6 inches in a manner so as to overcome problems of bunching of the material of the cylinder between the anvil and a stripping roller.

It is another object of the present invention to provide apparatus structurally interrelated in a novel manner for use in the production of helically wound cylinders.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a top plan view of the apparatus.

FIGURE 2 is a sectional view taken along the line 2—2 in FIGURE 1.

FIGURE 3 is a sectional view taken along the line 3—3 in FIGURE 2.

Referring to the drawing in detail, wherein like numerals indicate like elements, there is shown in FIGURE 1 apparatus for producing helically wound cylinders cut to unit lengths and designated generally as 10.

The apparatus includes a bed 12 adapted to be supported on the floor. A mandrel 14 is supported in cantilever fashion by housing 16 at one end of the bed 12. Mandrel 14 is stationary and hollow. A helically wound cylinder 17 is continuously produced on the mandrel 14 and moved in an axial direction in a conventional manner.

A web 18 is unwound from a roll 20 on a support stand 22. Adhesive may be applied to one of the surfaces of the web 18 by apparatus which is conventional and not shown. A web 24 is unwound from a roll 26 on support stand 28. The webs 18 and 24 are helically wound around the mandrel 14 and moved therealong by an endless belt 30 extending around driven pulleys 32 and 34. If it is desired to have the outermost layer of the cylinder 17 in the form of a printed label, a third roll of label material will be provided and fed in overlapping relationship with web 24 with means being provided to apply adhesive to the web 24.

At the lefthand end of bed 12 in FIGURE 1, there is supported a carriage 35 reciprocally mounted for movement along the bed in a conventional manner. An anvil designated generally as 36 is disposed above the carriage in line with the mandrel 14 and concentric therewith. The outer diameter of the mandrel 14 and anvil 36 is identical. One end of a rod 38 is adjustably connected to an end plug 42 on one end of the anvil 36.

The rod 38 extends through a hollow guide plug 40 at the free end of mandrel 14. As mentioned above, the mandrel 14 is hollow. Rod 38 extends through the mandrel 14 and the housing 16. The outer periphery of the rod 38 in the vicinity of housing 16 is provided with longitudinally extending splines so that anvil 36 may be rotatably driven and be able to reciprocate in an axial direction. The other end of rod 38 is adjustably connected to a connecting member 39 which in turn is connected to one end of a rod 38'. The other end of rod 38' is adjustably connected to the carriage 35.

The rods 38 and 38' are parallel to one another and reciprocate with each other. A suitable bearing is provided on the rod 38 juxtaposed to the connecting member 39 so that member 39 does not rotate with rod 38.

Idler supporting rollers 44 and 46 may be provided on the carriage 35 adjacent the periphery of anvil 36 at one end thereof and below the longitudinal axis of anvil 36. A concave stripping roller 48 is rotatably supported adjacent the free end of anvil 36 and juxtaposed to the periphery thereof. Stripping roller 48 may be driven in any convenient manner such as by means of a chain 50 connected to a motor (not shown) supported by the carriage 35. The last-mentioned motor is synchronized with the driving motors for the pulleys 32 and 34.

The anvil 36 is preferably hollow. Anvil 36 is comprised of a plurality of aligned sections metallurgically bonded to one another such as by brazing or otherwise connected together. In order to reduce the weight of the anvil 36, it is preferably comprised of sections 52, 58, 64 and 70 made from a lightweight noncorrosive material such as aluminum. The remaining sections, namely 54, 60 and 66 are preferably made from a hardened steel. Tension rods, not shown, in said aluminum and steel sections retain the sections in assembled relationship. Section 54 is provided with an internal reinforcing rib 56. Section 60 is provided with an internal reinforcing rib 62. Section 66 is provided with an internal reinforcing rib 68. Steel sections 54 and 66 are longer than steel section 60.

Cutters 72 and 74 are supported by the carriage 35 for reciprocation therewith and movement toward and away from the outer periphery of section 54 adjacent the location of rib 36. Cutters 76 and 78 are likewise supported by the carriage for movement toward and away from the section 60 of the anvil 36. Cutters 80 and 82 are likewise supported by the carriage 35 for movement toward and away from the section 66 adjacent the rib 68.

Magnetic means is provided to counterbalance the weight of the anvil 36 and lift the anvil 36 upwardly so as to prevent thin walled cylinders from bunching up at the location between the stripping roller and the outer periphery of the section 52 on the anvil 36. Such magnetic means includes a magnet 84 spaced from a magnet 86 and above the anvil 36. The spaced magnets 84 and 86 are supported by a support member 90 of nonmagnetic material on a frame designated generally as 88. The frame 88 is supported by the bed 12 and is stationary with respect to the carriage 35 as well as the anvil 36. Since the anvil reciprocates and the magnets are stationary, anvil sections 54 and 66 are longer than the section 60. In this manner, a portion of the anvil 36 made from a ferrous material will always be juxtaposed to the magnets 84 and 86 in all reciprocatory positions of the anvil 36. A spacer made from a nonmagnetic material such as a polymeric plastic may be disposed between the magnets and their supporting member 90.

A limit stop may be supported by the member 90 to limit the upward extent of the magnetic attraction exerted on the anvil 36. The limit stop is preferably in the form of a rotatable ball 92 supported at one end of a mounting member and secured to the lowermost surface of the member 90. The distance between the outer periphery of the anvil 36 and the ball 92 is less than the distance between the outer periphery of the anvil 36 and the magnets. Hence, the tube 17 as it travels along the anvil 36 will contact the rotatable limit stop 92 before contacting the magnets 84 and 86. Ball 92 may be referred to hereinafter as a rotatable limit stop means. The magnetic resistance of paper is substantially the same as that of air, hence the tube 17 does not interfere with the magnetic attraction of the magnets 84 and 86.

The magnets 84 and 86 are perferably electromagnets coupled to a source by way of a control such as a rheostat (not shown). In this manner, a fine adjustment of the magnetic field strength can be obtained as required by the air gap which varies with the thickness of the paper. While permanent magnets will work, they lose their strength after relatively short periods of time and do not offer any opportunity to adjust field strength as the air gap changes due to a change in paper thickness. Thus, magnets 84 and 86 may be referred to as variable strength means for magnetically attracting the anvil.

Thus, it will be seen that the present invention is directed to apparatus which solve a problem associated with machines for making spirally wound cylinders of thin walled paper. Thin walled paper cylinders are those having a thickness of about .020 inch. The problem is solved by counterbalancing the weight of the anvil which is mounted for rotation about its longitudinal axis and reciprocation along its longitudinal axis.

The present invention may be embodied in other specific forms without departing from the spirit or essential attributes thereof and, accordingly, reference should be made to the appended claims, rather than to the foregoing specification as indicating the scope of the invention.

I claim:

1. In apparatus for making helically wound cylinders comprising a hollow anvil having a diameter in excess of 5 inches and comprised of a plurality of sections at least one of which is made from ferrous material, means connected to the anvil for rotating the anvil about its longitudinal axis, and variable strength means above the anvil for magnetically attracting the anvil ferrous section upwardly without interfering with movements of the anvil and in all positions of the anvil, said variable strength means including an electromagnet mounted above and spaced from said anvil and a rotatable limit stop supported above the anvil to limit the extent of upward movement of the anvil due to the magnetic attraction.

2. In apparatus for making helically wound cylinders comprising a horizontally disposed mandrel around which a cylinder may be helically formed, an anvil in line with said mandrel and having a free end portion from which the cylinder may be discharged, a stripping roller adjacent said free end portion of said anvil and between which the cylinder may be moved, and means above and spaced from a portion of said anvil for electromagnetically attracting said portion upwardly away from said stripping roller to prevent bunching of helically wound cylinders at said stripping roller, and including a reciprocal carriage, said anvil being connected to said carriage for reciprocation therewith, fine control means for varying the strength of said electromagnetic attracting means, and cutters on the carriage for cutting cylinders to unit lengths while the cylinders are telescoped over the anvil.

3. In apparatus for making helically wound cylinders comprising a horizontally disposed mandrel around which a cylinder may be helically formed, an anvil in line with said mandrel and having a free end portion from which the cylinder may be discharged, a stripping roller adjacent said free end portion of said anvil and between which the cylinder may be moved, and means above and spaced from a portion of said anvil for electromagnetically attracting said portion upwardly away from said stripping roller to prevent bunching of helically wound cylinders at said stripping roller, and wherein said anvil is formed of a plurality of sections some of which are of ferrous material, other of said sections being nonferrous material, said anvil being hollow, and said means for magnetically attracting a portion of said anvil upwardly including at least one electromagnet supported above the anvil and juxtaposed to at least one ferrous section, the length of the ferrous section being sufficient so as to be juxtaposed to its electromagnet in all reciprocatory positions of the anvil.

References Cited
UNITED STATES PATENTS

| | | | |
|---|---|---|---|
| 549,667 | 11/1895 | Denney | 93—80 |
| 2,603,289 | 7/1952 | Horton | 83—577 |
| 2,699,099 | 1/1955 | Robinson | 93—80 |
| 3,080,784 | 3/1963 | Schneider | 83—575 X |
| 3,256,128 | 6/1966 | Richardson | 93—80 X |
| 3,279,229 | 10/1966 | Lagher | 72—430 X |

WILLIAM W. DYER, Jr., *Primary Examiner.*

WAYNE A. MORSE, Jr., *Assistant Examiner.*